Figure 1:
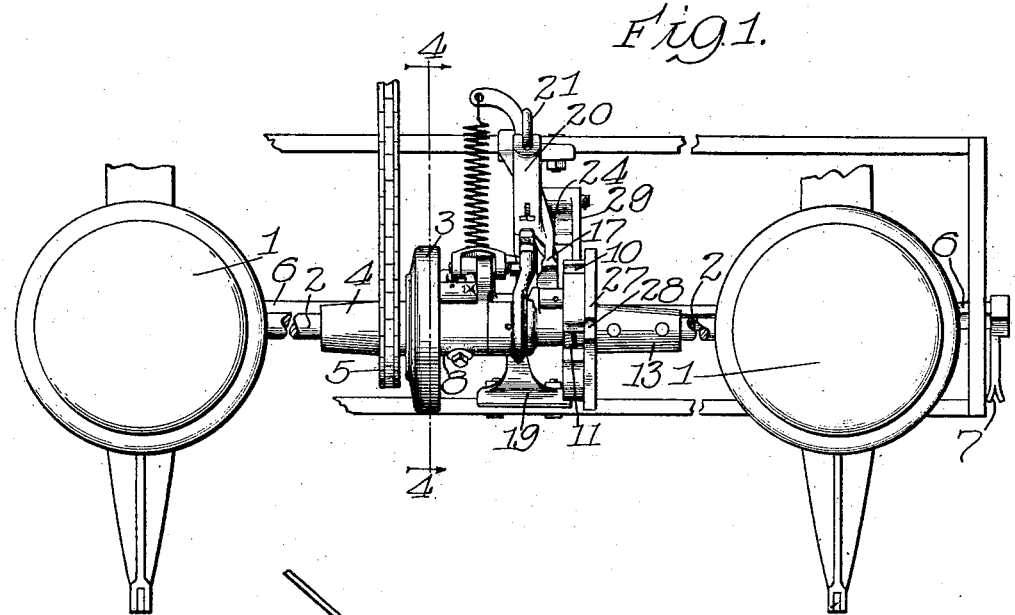

E. M. HEYLMAN.
CORN PLANTER CLUTCH MECHANISM.
APPLICATION FILED OCT. 3, 1912.

1,109,067.

Patented Sept. 1, 1914.

3 SHEETS—SHEET 1.

E. M. HEYLMAN
CORN PLANTER CLUTCH MECHANISM.
APPLICATION FILED OCT. 3, 1912.
1,109,067.
Patented Sept. 1, 1914.
3 SHEETS—SHEET 2.
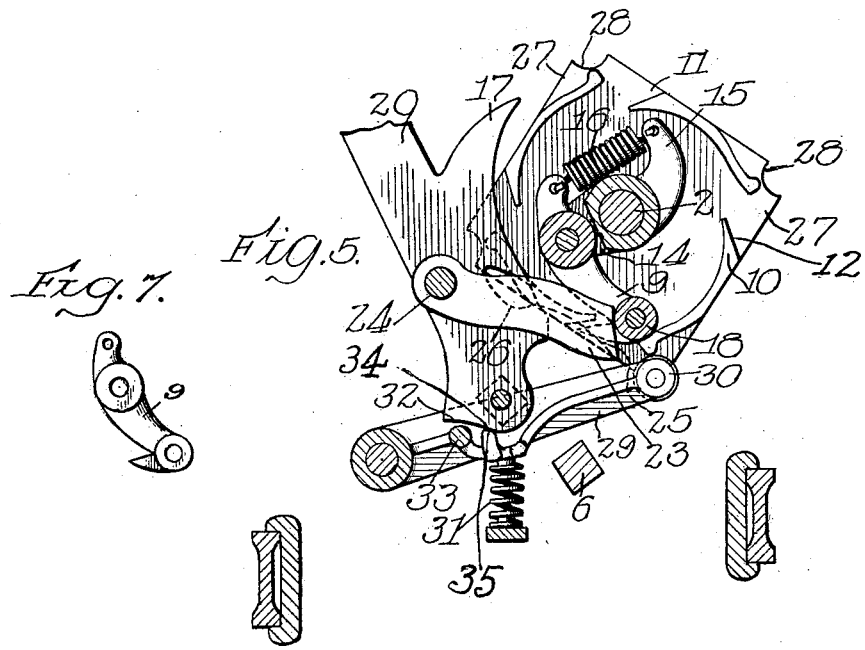
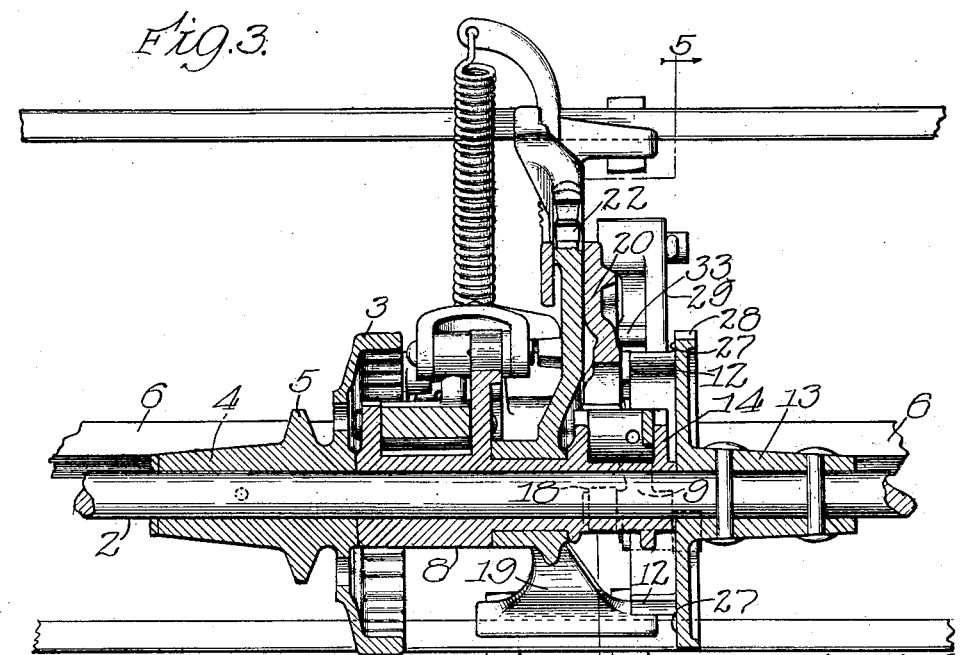

E. M. HEYLMAN.
CORN PLANTER CLUTCH MECHANISM.
APPLICATION FILED OCT. 3, 1912.
1,109,067.
Patented Sept. 1, 1914.
3 SHEETS—SHEET 3.
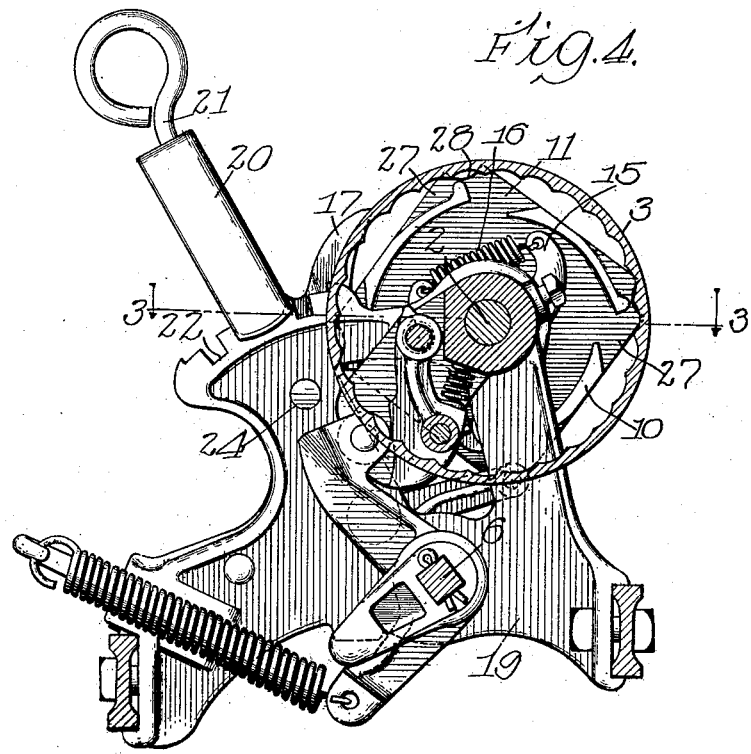
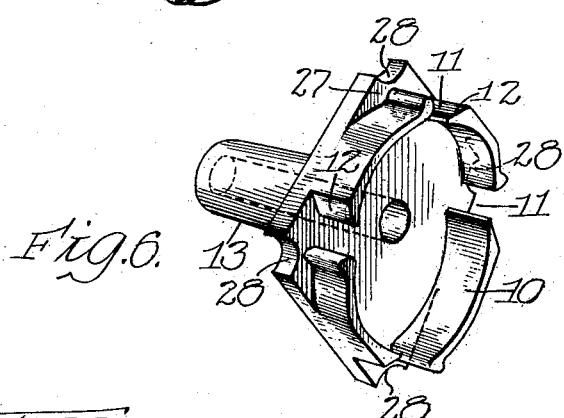

UNITED STATES PATENT OFFICE.

EDWARD M. HEYLMAN, OF ROCK ISLAND, ILLINOIS, ASSIGNOR TO ROCK ISLAND PLOW COMPANY, OF ROCK ISLAND, ILLINOIS, A CORPORATION OF ILLINOIS.

CORN-PLANTER CLUTCH MECHANISM.

1,109,067.

Specification of Letters Patent. Patented Sept. 1, 1914.

Application filed October 3, 1912. Serial No. 723,653.

*To all whom it may concern:*

Be it known that I, EDWARD M. HEYLMAN, a citizen of the United States of America, and resident of Rock Island, Rock Island county, Illinois, have invented a certain new and useful Improvement in Corn-Planter Clutch Mechanism, of which the following is a specification.

My invention relates to corn planter clutch mechanisms such as are used for operating the seed dropping mechanisms. It relates more particularly to the type of mechanism in which a primary and secondary clutch mechanism is employed and in which provision is made for variably operating the seed dropping mechanism whereby one, two, three or four kernels of corn can be deposited in a hill.

Among the objects of my invention are to generally improve the construction of the secondary clutch mechanism and to provide an arrangement in which the wear upon the parts is generally reduced. This secondary clutch mechanism includes a clutch member or ratchet with which a dog is adapted to engage, which dog engages the clutch member for a varying distance during its revolution, depending upon the number of kernels of corn which is desired to be deposited. This dog can be disconnected from the clutch member and heretofore in constructions of this type it has been found that a great deal of wear occurs upon the face of the dog, due to the rubbing action which occurs when the dog is disconnected from the clutch member.

Special objects of my invention are, therefore, to provide means for eliminating this wear by rendering the dog free at the time it is to be disconnected.

These and other objects of my invention will be more readily understood by having reference to the accompanying drawings in which I have illustrated one embodiment of my invention, and in which similar reference characters refer to similar parts.

Figure 2:
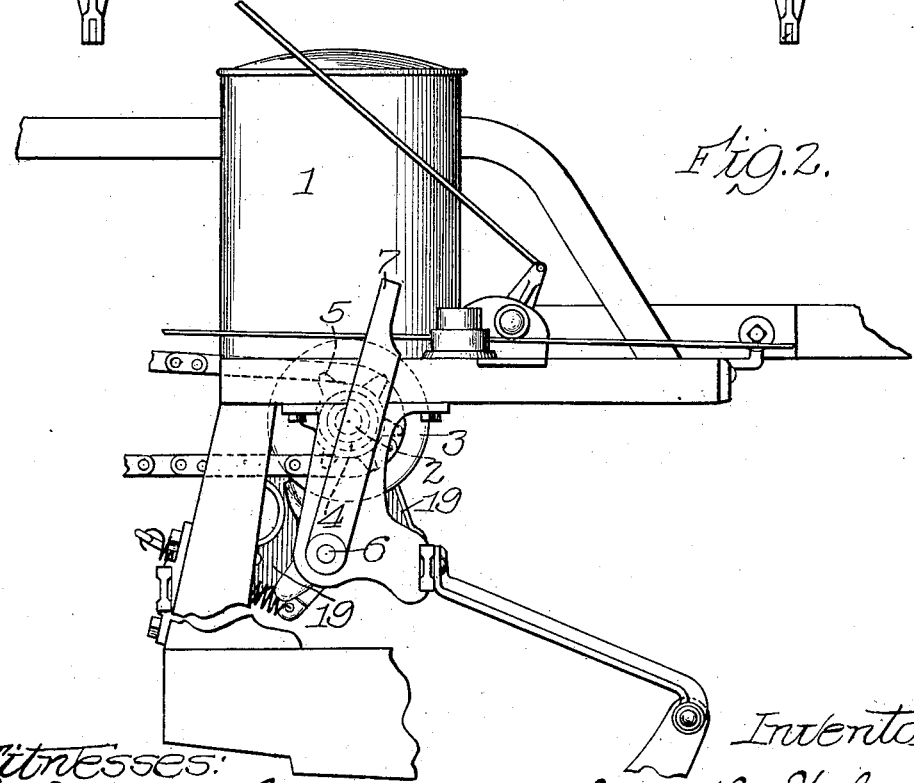

Figure 1 is a plan view of a corn planter mechanism. Fig. 2 is a side view of the same. Fig. 3 is a sectional view taken on the line 3—3 in Fig. 4. Fig. 4 is a sectional view taken on the line 4—4 in Fig. 1. Fig. 5 is a sectional detail of a part of the secondary clutch mechanism taken on the line 5—5 in Fig. 3. Fig. 6 is a perspective detail view of a part of the secondary clutch mechanism. Fig. 7 is a detail of the clutch dog.

I have illustrated my invention in connection with a seed dropping mechanism comprising the seed boxes 1, which contain the usual seed plates driven by the seed shaft 2. In order to properly operate this seed shaft, so as to variably control the seed plates, the primary and secondary clutch mechanism is provided. Any well known form of primary clutch mechanism can be employed, and this forms no part of my present invention. The mechanism I have chosen to illustrate is a well known form comprising the clutch wheel 3 mounted upon a sleeve 4, which sleeve is loosely mounted upon the seed shaft 2 and is driven from the ground wheels through the medium of the sprocket wheel 5. The interior circumferential face of this clutch wheel 3 is provided with a series of depressions with which the dog is adapted to engage. The engagement of the dog with this clutch wheel is controlled by means of the rock shaft 6 in such a manner that each time this rock shaft is operated by means of the check fork 7, it engages the clutch wheel for one complete revolution and then is disconnected therefrom. This form of clutch mechanism being well known, it is not thought necessary to give any more detail description of the same. Referring to Fig. 3, however, it will be noticed that each time the check-row fork 7 engages with a knot on the check-row wire the primary clutch mechanism operates to rotate the sleeve 8, which carries the dog of the primary clutch mechanism, one complete revolution. Located on this sleeve is the dog 9 of the secondary clutch mechanism, so that this dog is likewise rotated one complete revolution. This dog 9 is adapted to engage with a clutch member or ratchet 10, which member comprises a cylindrical flange provided with four openings, each opening being formed at one side thereof with a beveled engaging portion 12. This clutch member is mounted on the sleeve 13 which is fast upon the seed shaft 2, so that the operation of this clutch member operates the seed shaft and thus rotates the seed plates.

In order to produce the desired variation in the operation of the seed shaft, whereby a varying number of kernels of corn can be deposited in a hill, it is necessary to provide means for rotating this clutch mechanism either a complete revolution or a partial revolution for each complete revolution of the primary clutch mechanism. This is accomplished by having the dog 9 engage with the clutch member 10 for a greater or less extent during its rotation. Thus if it is desired to plant four kernels of corn in a hill, the dog is permitted to engage the clutch member at all times during its rotation, and thus the seed plate is permitted to travel far enough so that four seed cells will pass over the discharge opening, and thus four kernels of corn are deposited in the hill; but if it is desired to plant but three kernels, the dog 9 is thrown out of engagement with the clutch member 10 for the first quarter of its revolution and is then permitted to engage with this clutch member for the remaining three-quarters of its revolution, thus rotating the seed shaft three-quarters of its revolution, thus depositing but three kernels of corn. In a similar manner, if it is desired to deposit but two kernels of corn in a hill, the dog is thrown out of engagement with the clutch member during the first one-half of the revolution and is in engagement with the same only during the last one-half of the revolution. It will be noticed, however, that in this clutch construction the dog is always in engagement with the clutch member during the last part of the rotation, the varying engagement occurring entirely in the first part of the rotation. This dog 9 is pivoted on an arm 14 carried by the sleeve 8, which arm is provided with an oppositely extending and upwardly curved end portion 15. A spring 16 is secured between this end portion 15 and the tail end of the dog 9, and in this manner the dog is pressed outwardly so as to normally tend to engage with the openings in the clutch member 10. In order to disengage this dog from the ratchet device for a portion of the operation, a cam 17 is provided, which cam is adapted to be brought into the path of the roller 18 carried by the dog 9 to force the dog out of engagement with the openings in the clutch member 10. This cam is pivoted to the casting 19 which is mounted upon the frame bars and is provided with an upwardly extending handle 20 which carries the spring finger 21, which is adapted to engage with the notches in the rack 22 whereby the position of this cam can be adjusted to and from the path of the dog 9. This cam is so located that when it is adjusted in the notch nearest to the right, looking in Fig. 4, the dog will be in engagement with the clutch mechanism but for one-half of a revolution, while when in the middle notch the dog will engage the ratchet device for three-quarters of a revolution, while in the outside notch the dog and ratchet will be in engagement for a complete revolution.

In order to positively limit the movement of the dog 9 at the end of each revolution, a stop is provided which stop is in the form of an arm 23 which is pivoted to the bracket 19 at the point 24. This arm is cut away along the line 25, shown dotted in Fig. 5, so that this arm is thicker at the portion above the line than below this line. The handle 20 is provided with a lug 26 which is provided with a surface which engages with the projecting edge of this thickened portion of the arm 23. In this manner when the handle is in either the first or second notches, the stop is positively held in the path of the roller 18. When this handle is swung to the outside position, however, the projection 26 is swung backward so that it does not engage with the thickened portion of the arm 23, and thus this stop is permitted to drop down out of the path of the roller 18. This is advantageous, as when the planter is operated for dropping two or three kernels in a hill it is desirable that the dog be brought to a positive stop on the end of each rotation where it is positioned to be thrown out of engagement with the clutch member for the first quarter or one-half of the next revolution. When, however, the planter is being used for drilling or for planting four kernels in a hill, it is not necessary to throw the dog out of engagement with the clutch member and, therefore, this stop is unnecessary, and for this reason I provide this means for throwing the stop arm out of engagement with the roller under these conditions. While this stop is of such construction that when it engages with the roller 18 it prevents any further forward movement of the dog, due to pressure exerted through the medium of the clutch member 10, yet, of course, it is understood that when the power is applied to the sleeve 8 and thus to the dog 9 to rotate the same, the roller 18 rolls up over the upper surface of this stop and in this manner draws the dog out of engagement with the opening 11 in the clutch member 10.

Heretofore in constructions of this kind it has been found that when the dog is withdrawn from engagement with the beveled surface 12 of the clutch member 10 that considerable wear is occasioned on this beveled surface and on the face of the dog. This is due to the friction occasioned by withdrawing the dog while it is in frictional engagement with this beveled surface 12. In order to obviate this objectionable feature, I have provided means whereby the dog is free from any engagement with the surface 12 at the time it is raised from this opening by the stop arm 23. In order to accomplish this, I provide the clutch member 10 with a cam wheel consisting of four corner projections 27, each provided with a circular depression 28, and an arm 29 is pivoted to the casting 19 and is provided with a roller 30 which is adapted to engage with these circular depressions. This arm is controlled by a spring 31 so as to be forced upward into engagement with these depressions. The movement of the arm, however, is limited by means of the stop 34 which is formed by the lower end of the handle 20 engaging with a projection 35 on this arm 29. This stop 34 is so positioned that when the handle 20 is in the first two notches—that is, the notches for planting two or three kernels—the roller 30 is permitted to engage with the circular notches 28 but does not engage with the cam wheel between the notches, thus greatly reducing the wear on the operative parts. When, however, the handle is in the outside position or for planting—that is, the position for planting four kernels of for drilling—the stop 32 on the lower end of the handle 20 strikes the stop 33 and forces the arm 29 downward so that the roller 30 is not permitted to engage with the depressions 28.

Having now described the various parts of my mechanism, I will now briefly describe the operation of the same. When the check-row fork 7 strikes a knot in the check-row wire, the check-row shaft is oscillated so as to operate the primary clutch mechanism so as to rotate and cause the sleeve 8 to be rotated one complete revolution, in a manner well understood. This rotation of the sleeve 8 causes the dog 9 to likewise rotate. Assuming that the handle 20 is in the mid-position shown in Fig. 4, the cam 17 will be in such a position that the dog 9 does not engage with the clutch member 10 for the first quarter of the revolution. Therefore, at the start of the revolution of this dog 9, the roller 18 rolls over the upper surface of the stop arm 23 and then along the surface of the cam 17 without imparting rotation to the clutch member 10. When, however, the dog has reached the opening 11, shown in the left hand portion of Fig. 5,—that is, has completed one-fourth of its revolution—the spring 15 forces the dog into engagement with this opening, as in this position the cam 17 does not prevent such engagement. The dog then continues to rotate for the remaining three-fourths of its revolution and carries along with it the clutch member 10, which in turn rotates the said shaft and the said seed plate far enough to pass three seed cells over the discharge opening above the valve in the runner shank. During this rotation the roller 30 rolls in and out of the corresponding depressions of the circular depressions 28, being forced downwardly slightly by the projecting corners 27 and then snapping into the depression 28. Just before the roller 18 comes into engagement with the stop arm 23, the roller 30 engages with the inclined end of the corner 27. This engagement thus retards the movement of the ratchet device and stops any momentum it may have obtained and thus causes the dog to more firmly engage with the beveled surface 12 of the opening 11. The dog then comes in contact with the stop 23 and is thus prevented from moving forward farther, and then at the same time the roller 30 snaps into the depression 28, and this movement tends to give this ratchet device 10 a slight forward rotation. This rotation is just enough to free the dog 9 from engagement with the beveled surface 12, and thus on the next operation when this dog is withdrawn from this opening, there is no friction or wear as the dog at this time is not engaging with the beveled surface 12.

It will thus be seen that I have devised a very efficient form of variable clutch mechanism, and one in which the wear on the operating parts is greatly reduced.

While I have illustrated and described one embodiment of my invention, it will be understood that I do not wish to be limited to the exact construction shown and described, as many modifications will be readily suggested to those skilled in the art, but which still come within the broader aspects of my invention.

What I claim as my invention is:

1. In a planter, the combination with a seed plate, of a constantly operating mechanism, and connecting means comprising a shaft for operating said plate, a revoluble device adapted to be connected with the constantly operating mechanism for a constant predetermined amount of movement, a pawl for connecting said revoluble device and said shaft, means for disengaging said pawl from said device, and a lever provided with a cam surface for engaging said pawl and raising it from said revoluble device for a part of the movement of the latter after said pawl has been disengaged from said device.

2. In a planter, the combination with a seed plate and a shaft for actuating the same, of a constantly rotating device revolubly mounted on said shaft, a sleeve loosely mounted on said shaft and adapted to be connected with said constantly rotating device for a constant predetermined movement, a ratchet rigidly secured to said shaft, a pawl carried by said sleeve and normally engaging said ratchet, means for disengaging said pawl from said ratchet, and a lever provided with a cam surface for engaging said pawl and raising it from said ratchet during a part of the movement of said sleeve after the pawl has been disengaged from said ratchet.

3. In a planter, the combination of a clutch mechanism including a rotatable shaft, a constantly rotatable clutch member journaled upon said shaft and having a rim portion provided with internal depressions, a sleeve journaled upon said shaft adjacent said member, a pawl carried by said sleeve and adapted to engage with said depressions, a rocking clutch tripping member adapted to normally hold said pawl disengaged, a second clutch member secured to said shaft at the opposite end of said sleeve and provided with pawl engaging grooves upon its periphery, a second pawl carried by said sleeve and adapted to engage with said grooves, means for first moving said second pawl from engagement with said grooves, and a swinging cam adapted to engage with said second pawl and then raise it from said grooves to disengage the same after said first disengagement for various degrees of angular movement of said second clutch member.

4. In a planter, a rotary seed shaft, a clutch wheel secured upon said shaft, said clutch wheel provided with a peripheral flange having openings therein, a pivoted dog working inside of said clutch wheel, adapted to engage said openings, means for first causing said dog to disengage from said openings, and means for then moving said dog so as to skip one or more openings before again engaging therewith.

5. In a planter, a rotary seed shaft, a clutch wheel secured upon said shaft, said wheel provided with a peripheral flange having openings therein, a rotary element which is loose on said shaft, a dog pivoted on said element adapted to engage said openings, a spring for forcing the dog into the openings, means for first causing said dog to disengage from the openings, and means for then causing the dog to skip one or more of said openings before again engaging therewith.

6. In a planter, a rotary seed shaft, a clutch member secured thereon, said clutch member having a flange provided with openings therein, a rotary element which is loose on said shaft, a dog pivoted on said rotary element adapted to engage said openings, a spring controlling said dog, whereby the dog rides on the flange until it encounters one of said openings, said openings being provided with a beveled surface which is engaged by a hook portion of said dog, means for first moving said dog out of engagement with said beveled surface, and a cam for then raising said dog out of engagement with said openings so as to skip one or more of said openings before again engaging therewith.

7. In a planter, a rotary seed shaft, a clutch member secured thereon, said clutch member having a flange provided with openings therein, a rotary element which is loose on said shaft, a dog pivoted on said rotary element adapted to engage said openings, a spring controlling said dog, whereby the dog rides on the flange until it encounters one of said openings, said openings being provided with a beveled surface which is engaged by a hook portion of said dog, means for first moving said dog portion out of engagement with said beveled surface, a cam for then raising said dog out of engagement with said openings so as to skip one or more of said openings before again engaging therewith, and mechanism for changing the position of said cam whereby the extent of rotation of said shaft may be varied at will.

8. In a planter, a rotary seed shaft, a clutch member secured thereon, said clutch member having a flange provided with openings therein, a rotary element which is loose on said shaft, a dog pivoted upon said rotary element and adapted to engage said openings, means for causing said rotary element and dog to make one complete revolution, means for stopping said dog at the end of said revolution, means for imparting an additional rotation to said clutch member, and means for then raising said dog out of engagement with said opening.

9. In a planter, a rotary seed shaft, a clutch member secured thereon, said clutch member having a flange provided with openings therein, a rotary element which is loose on said shaft, a dog carried by said rotary element and adapted to engage said openings, a spring controlling said dog whereby said dog rides on the flange until it encounters one of said openings, means for rotating said dog one complete revolution and then bringing the same to a positive stop, means for giving said clutch member a slight additional rotation after the dog has been brought to said stop so as to disengage said dog from said opening, and a cam for then raising said dog out of engagement with said opening, whereby said dog is caused to skip one or more of said openings before again engaging therewith.

10. In a planter, a rotary seed shaft, a clutch member secured thereon, a rotary element loose on said shaft, a dog carried by said rotary element and adapted to engage said clutch member to rotate the same, means for rotating said dog one complete revolution, means for then rotating said clutch member a slight distance to disengage said dog from said clutch member, and means for then raising said dog out of engagement with said member whereby said dog may be rotated independently of the clutch member.

11. In a planter, a rotary seed shaft, a clutch member secured thereon, said member having a flange provided with openings therein, each opening being provided with a beveled portion, a pivoted dog loosely mounted upon said shaft and provided with a hooked-end portion adapted to engage said beveled portions, and a circular depression adjacent to each opening, a spring-pressed roller adapted to engage with said depressions, means for rotating said dog one complete revolution and thus imparting rotation to said clutch member through the engagement of said dog with said beveled portion of the flange, means for stopping said dog at the end of said rotation, the engagement of said spring-pressed roller with one of said circular depressions giving said clutch member a slight additional rotation, whereby said hooked-end portion of the dog is disengaged from said beveled portion, and means for then raising the said dog from said opening when said dog is next rotated, whereby said dog is permitted to rotate independently of said clutch member.

12. In a planter, a rotary seed shaft, a clutch member secured thereon, said member having a flange provided with openings therein, each opening being provided with a beveled portion, a pivoted dog loosely mounted upon said shaft and provided with a hooked-end portion adapted to engage said beveled portions, and a circular depression adjacent to each opening, a spring-pressed roller adapted to engage with said depressions, means for rotating said dog one complete revolution and thus imparting rotation to said clutch member through the engagement of said dog with said beveled portion of the flange, means for stopping said dog at the end of said rotation, the engagement of said spring-pressed roller with one of said circular depressions giving said clutch member a slight additional rotation, whereby said hooked-end portion of the dog is disengaged from said beveled portion, a cam for engaging said dog and adapted to raise the hooked-end portion of the dog from said opening after it has been disengaged from said beveled surface, whereby said dog may skip one or more of said openings, and mechanism for changing the position of said cam whereby the extent of rotation of the shaft may be varied at will.

13. In a planter, a rotary seed shaft, a clutch member secured thereon, said member having a flange provided with openings therein, each opening being provided with a beveled portion, a pivoted dog loosely mounted upon said shaft and provided with a hooked-end portion adapted to engage said beveled portions, and a circular depression adjacent to each opening, a spring-pressed roller adapted to engage with said depressions, means for rotating said dog one complete revolution and thus imparting rotation to said clutch member through the engagement of said dog with said beveled portion of the flange, means for stopping said dog at the end of said rotation the engagement of said spring-pressed roller with one of said circular depressions giving said clutch member a slight additional rotation, whereby said hooked-end portion of the dog is disengaged from said beveled portion, a cam for engaging said dog and adapted to raise the hooked-end portion of the dog from said opening after it has been disengaged from said beveled surface, whereby said dog may skip one or more of said openings, and mechanism for moving said cam out of engagement with said dog and at the same time moving said roller out of engagement with said circular depressions.

14. In a planter, a rotary seed shaft, a clutch member secured thereon, a rotary element loose on said shaft, a dog carried by said rotary element and adapted to engage said clutch member to rotate the same, an arm adapted to engage said clutch member to retard the motion of the same, and means for moving said arm out of engagement with said clutch member whereby the same is free to rotate.

15. In a planter, a rotary seed shaft, a clutch member secured thereon, a rotary element loose on said shaft, a dog carried by said rotary element, adapted to engage said clutch member to rotate the same, a spring-pressed arm adapted to engage said clutch member to retard the rotation of the same, a cam adapted to engage said dog to raise the same out of engagement with said clutch member, and an arm for moving said cam and spring-pressed arm out of engagement with said dog and clutch member.

Signed by me at Chicago, Illinois, this 27th day of September, 1912.

EDWARD M. HEYLMAN.

Witnesses:
 H. A. SWENARTON,
 G. ERANIUS GRANSTROM.

---

Copies of this patent may be obtained for five cents each, by addressing the "Commissioner of Patents, Washington, D. C."